UNITED STATES PATENT OFFICE.

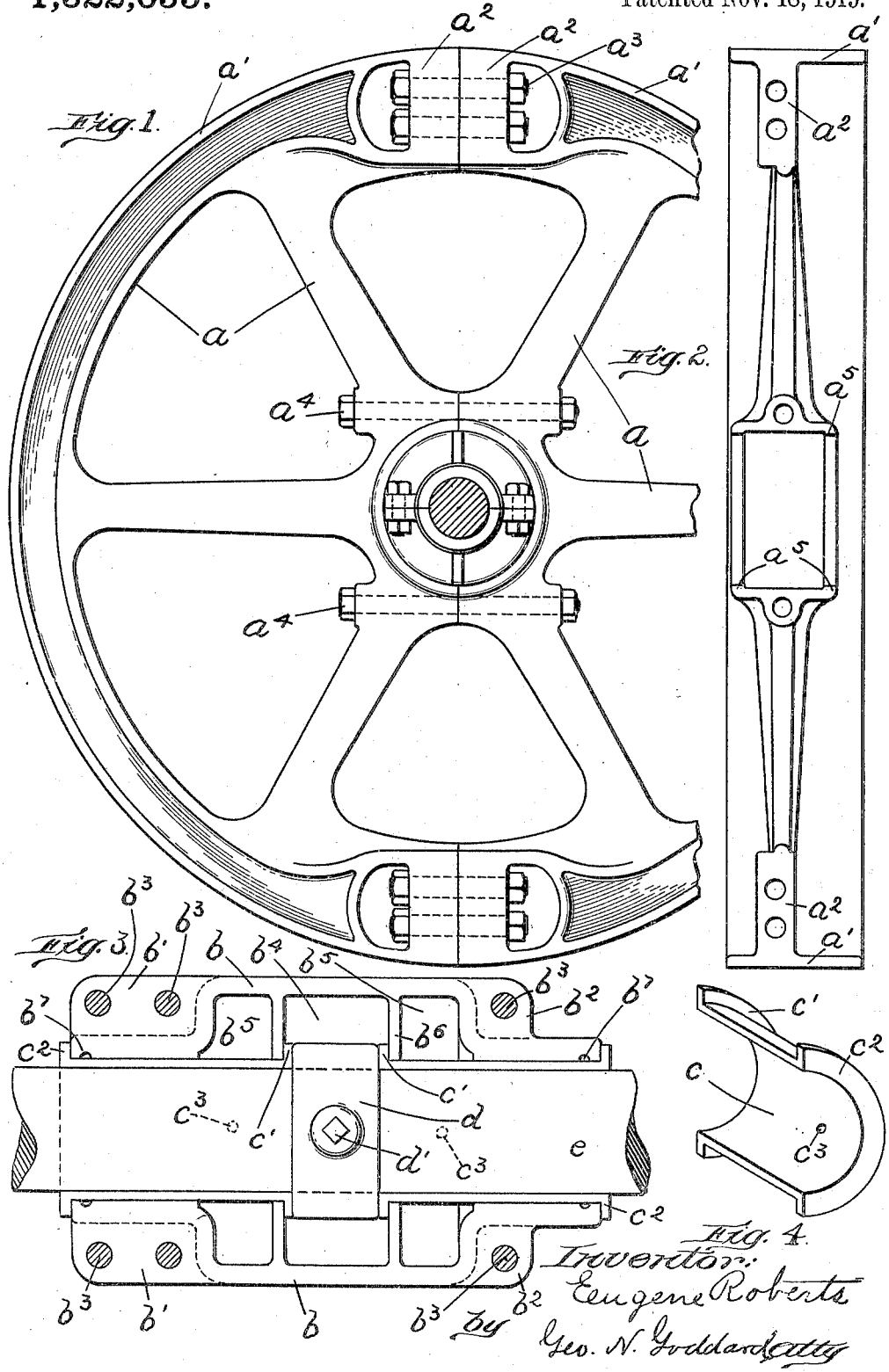

EUGENE ROBERTS, OF SALT LAKE CITY, UTAH, ASSIGNOR TO THE WESTERN STATES MACHINE COMPANY, OF SALT LAKE CITY, UTAH, A CORPORATION OF UTAH.

DEMOUNTABLE PULLEY.

1,322,055.   Specification of Letters Patent.   Patented Nov. 18, 1919.

Application filed January 24, 1918. Serial No. 213,449.

*To all whom it may concern:*

Be it known that I, EUGENE ROBERTS, citizen of the United States, and resident of Salt Lake City, county of Salt Lake, State of Utah, have invented certain new and useful Improvements in Demountable Pulleys, of which the following is a specification.

This invention relates to pulleys and more especially to a type of pulley intended to run loosely on its supporting shaft to which it may be coupled for driving purposes by means of a friction clutch.

One object of the invention is to produce a pulley adapted for this purpose which shall be self-lubricating and which shall be easily demountable from the line shaft on which it is carried without the necessity of taking down the line shaft for that purpose.

In its general features the invention comprises essentially, a split or sectional pulley adapted to be detachably clamped upon a split supporting hub inside of which are located assembled bearing bushings formed to rotatably fit the pulley shaft, means being provided for preventing endwise play of the hub on the shaft and for properly lubricating the bearings.

This and other features of the invention will be more particularly set forth and explained in this specification, and will be defined in the claims annexed hereto.

In the accompanying drawings I have illustrated the preferred form embodying the principles of this invention in which:—

Figure 1 is a side elevation showing the entire pulley operatively assembled on the shaft.

Fig. 2 is an edge elevation showing the spider construction of the split pulley.

Fig. 3 is a detail view showing one of the two split sections of the hub with its interior bearing bushings operatively assembled on the shaft.

Fig. 4 is an enlarged detail perspective of one of the interior bearing bushings.

In the practice of the invention according to the form illustrated in the drawings, I form the pulley in two equal similar sections $a$, having a laterally projecting peripheral rim $a'$, and also at the opposite end portion of said rim, substantial inwardly-turned flanges $a^2$ perforated in tangential direction to receive the coupling bolts $a^3$. The central portion of the spider is also bored transversely of the plane of separation of the two parts or sections of the pulley to receive the central clamping bolts $a^4$. The central or hub portion of the spider is preferably recessed to leave at the opposite ends of the hub section inwardly projecting clamping or gripping shoulders $a^5$ which are intended to firmly grip the removable hub which will now be described.

The separable or detachable hub is made in the form of two half cylinders $b$ whose ends are extended to form webs or flanges $b'$ $b^2$ suitably bored to receive the clamping or fastening bolts $b^3$. Intermediate of the ends of the hub are provided hollow annular pockets or reservoirs $b^4$, $b^5$ separated by inwardly projecting flanges $b^6$ which form oil or grease retaining reservoirs for lubricating the pulley bearing.

In each of the pulley hub-sections $b$ are inserted a pair of semi-cylindrical flanged bushings $c$ provided with outwardly projecting flanges $c'$, $c^2$ which overlap respectively the inwardly projecting flanges $b^6$ and the outer ends of the hub sections.

A collar $d$ is affixed or secured to the shaft by means of set screw $d'$ and is of appropriate width to fit in between the inside flanges $c'$ of the bearing bushings to form a fixed guide to prevent endwise movement of the pulley on the shaft $e$.

The removable split bushings $c$ are of such internal diameter that when assembled they fit snugly around the shaft $e$ and are rotatable thereon so that the pulley may idle on the shaft when its rim is not clutched thereto. These bushings may be of any suitable material, but for purposes of durability, I prefer to make them of bronze. Their inside flanges $c'$ have bearing engagement against the sides of the collar $d$ while allowing the lubricating grease carried in the annular pocket $b^4$ to work its way inwardly to lubricate the opposing bearing surfaces. The bearing bushing may also be provided with perforations $c^3$ to allow the seepage of the lubricant along the shaft inside each bearing bushing.

To prevent the leakage of the lubricant through the end portions of the hub outside of the bushings $c$, I form shallow annular grooves on the inside face of the hub sections near the outer ends thereof as shown at $b^7$, this leakage being also further prevented by the external flanges $c^2$ of the bushings.

The method of assembling the pulley for service is as follows: The collar $d$ is secured to the shaft by means of the set screw $d'$ at the desired point. The four bushing sections are then inserted in the opposite ends of the respective hub sections, and the two assembled halves of the entire hub are brought together upon the shaft in the position shown in Fig. 3, and are clamped together by means of the coupling bolts $b^3$. The clamping action not only holds the two halves of the hub $b$ together, but it also clamps the hub firmly but detachably, upon the inside bearing bushings, whose internal diameter when assembled, is just large enough to turn freely without binding upon the shaft. It is to be understood that before assembling the hub members upon the shaft, the grease pockets $b^4$, $b^5$, are filled with a suitable lubricating grease.

The two halves of the pulley $a$, are then brought together around the middle portion of the hub, and are firmly and rigidly clamped thereto by means of the clamping bolts $a^4$, the rim portions of the pulley halves being firmly secured together by the rim bolts $a^3$.

It will be seen that by the above described construction and arrangement, I provide a self-lubricating loose pulley that is capable of quick and convenient mounting on the shaft or demounting therefrom without the necessity of taking down the line shaft for such operations.

I have not shown the driving clutch since any suitable form of driving clutch may be used, and the invention is concerned only with the pulley itself. While I have shown and described this invention as applied to a clutch driven pulley, it will of course be understood that the same principle is applicable to any form of loose or idler pulley whatever its purpose.

What I claim is:—

1. A loose pulley embracing in its construction a sectional or split pulley, and a removable split pulley hub adapted to be detachably clamped inside the sections of the split pulley and having removable internal anti-friction bearing bushings formed to fit rotatably on the shaft, and means for preventing longitudinal movement of said split hub on the shaft, substantially as described.

2. A demountable loose pulley for shafting embracing in its construction a pair of split pulley sections, a two part sectional hub adapted to be removably clamped therein, sectional bearing bushing members formed to fit rotatably around the supporting shaft, said sectional bearing bushing members being frictionally clamped inside said split hub, and means for preventing longitudinal movement of the hub on the shaft, substantially as described.

3. The combination of a shaft, a collar secured thereto, split sleeves adapted to fit loosely around the shaft, a sectional split hub adapted to be clamped firmly around said sleeve sections to hold them rigidly together around the shaft and in engagement with said collar, and a split pulley whose sections are adapted to be clamped around the exterior of the sectional hub, substantially as described.

4. The combination of a sectional pulley supporting hub, semi-cylindrical bearing bushings inserted inside said hub, clamping means for securing the sections of the hub together and holding the sections of said bearing bushings firmly together, grease pockets formed inside said hub to lubricate said bearing bushings, and a split pulley adapted to be detachably secured around the exterior of said hub, substantially as described.

5. The combination of a shaft, a collar fixed thereon, flanged bushing sections arranged on either side of said collar, a sectional hub provided with means for firmly clamping said hub upon said bushing sections, said hub being provided with an internal annular recess for retaining a lubricant, and adapted to carry around its outside a split pulley, substantially as described.

6. The combination of a shaft, sectional bearing sleeves surrounding said shaft, and provided at their opposite ends with outwardly projecting flanges, a split hub adapted to be clamped around said bearing sleeves to hold said bearing sleeves and said hub firmly together, said hub being provided with a grease cavity on its interior for lubricating the bearing and being externally formed to receive and retain a friction pulley, substantially as described.

In witness whereof, I have subscribed the above specification.

EUGENE ROBERTS.